US011936155B2

(12) United States Patent
Weaver et al.

(10) Patent No.: US 11,936,155 B2
(45) Date of Patent: Mar. 19, 2024

(54) TERMINAL BLOCK WITH COUPLING CAPABILITIES ON UPPER AND LOWER STUDS

(71) Applicant: TE Connectivity Services GmbH, Schaffhausen (CH)

(72) Inventors: Brian Keith Weaver, Harrisburg, PA (US); William James Moyer, II, Selinsgrove, PA (US); Divya Shukla, Harrisburg, PA (US)

(73) Assignee: TE Connectivity Solutions GmbH, Schaffhausen (CH)

( * ) Notice: Subject to any disclaimer, the term of this patent is extended or adjusted under 35 U.S.C. 154(b) by 0 days.

(21) Appl. No.: 17/502,900

(22) Filed: Oct. 15, 2021

(65) Prior Publication Data

US 2023/0124123 A1 Apr. 20, 2023

(51) Int. Cl.
*H01R 9/24* (2006.01)
*H01R 105/00* (2006.01)

(52) U.S. Cl.
CPC ........... *H01R 9/24* (2013.01); *H01R 2105/00* (2013.01)

(58) Field of Classification Search
CPC ...... H01R 9/24; H01R 9/2491; H01R 12/515; H01R 2105/00
See application file for complete search history.

(56) References Cited

U.S. PATENT DOCUMENTS 8,105,118 B2 * 1/2012 Claprood, Jr. ......... H01R 4/304 439/709
2001/0024911 A1 * 9/2001 Bre' ...................... H01R 13/748 439/717

* cited by examiner

*Primary Examiner* — Vanessa Girardi

(57) ABSTRACT

An appliance power connector includes a terminal block having a base. The base includes an upper surface and a lower surface. The base includes a pocket. The terminal block includes an upper shroud and a lower shroud. The upper shroud has upper shroud walls extending from the base forming an upper chamber above the upper surface. The lower shroud has lower shroud walls extending from the base forming a lower chamber below the lower surface. The appliance power connector includes a power terminal coupled to the terminal block. The power terminal includes a main body, an upper stud extending from a top of the main body and a lower stud extending from a bottom of the main body. The main body is received in the pocket. The upper stud is located in the upper chamber above the base for connection to an upper power cable terminal. The lower threaded stud is located in the lower chamber below the base for connection to a lower power cable terminal.

21 Claims, 5 Drawing Sheets

TERMINAL BLOCK WITH COUPLING CAPABILITIES ON UPPER AND LOWER STUDS

BACKGROUND OF THE INVENTION

The subject matter herein relates generally to power connectors.

Power connectors are used to power devices, such as appliances. In known appliances, the appliance wiring exits the appliance, such as from the rear of the appliance. The owner electrically connects the building wiring (line, neutral, ground) to the appliance wiring. For example, wire nuts may be used to directly connect the building wiring to the appliance wiring. The building wiring may include a plug cord coupled to the appliance and having a plug at an end of a cable assembly, where the plug is coupled to an outlet of the building to supply power to the appliance. Some known appliances include terminal blocks having terminals. The appliance wiring and the building wiring are connected to the terminals. However, access to the terminals is typically restricted making connection of the building wiring to the terminals difficult. Additionally, the appliance wiring and the building wiring are typically made at different times, which may lead to disconnection of the appliance wiring or loss of parts.

A need remains for a power connector for connecting wiring of an appliance with building wiring in a reliable manner.

BRIEF DESCRIPTION OF THE INVENTION

In one embodiment, an appliance power connector is provided and includes a terminal block having a base. The base includes an upper surface and a lower surface. The base includes a pocket. The terminal block includes an upper shroud and a lower shroud. The upper shroud has upper shroud walls extending from the base forming an upper chamber above the upper surface. The lower shroud has lower shroud walls extending from the base forming a lower chamber below the lower surface. The appliance power connector includes a power terminal coupled to the terminal block. The power terminal includes a main body, an upper stud extending from a top of the main body and a lower stud extending from a bottom of the main body. The main body is received in the pocket. The upper stud is located in the upper chamber above the base for connection to an upper power cable terminal. The lower threaded stud is located in the lower chamber below the base for connection to a lower power cable terminal.

In another embodiment, an appliance power connector is provided and includes a terminal block having a base. The base includes an upper surface and a lower surface. The base includes pockets spaced apart along the upper surface. The terminal block includes an upper shroud and a lower shroud. The upper shroud has upper shroud walls extending from the base forming upper chambers above the upper surface. The upper shroud walls separate the upper chambers from each other. The upper chambers is aligned with the pockets. The lower shroud has lower shroud walls extending from the base forming lower chambers below the lower surface. The lower shroud walls separate the lower chambers from each other. The lower chambers is aligned with the pockets. The appliance power connector includes power terminals coupled to the terminal block at the pockets. The power terminals include a line terminal, a neutral terminal and a ground terminal. Each power terminal includes a main body, an upper stud extending from a top of the main body and a lower stud extending from a bottom of the main body. The main body has a locating surface. The main body is received in the corresponding pocket with the locating surface engaging the terminal block to locate the power terminal relative to the terminal block. The upper stud is located in the corresponding upper chamber above the base. The lower threaded stud is located in the corresponding lower chamber below the base. The lower stud of the line terminal is configured to be coupled to an appliance line wire of an appliance wire harness and the upper stud of the line terminal is configured to be coupled to a building line wire. The lower stud of the neutral terminal is configured to be coupled to an appliance neutral wire of the appliance wire harness and the upper stud of the neutral terminal is configured to be coupled to a building neutral wire. The lower stud of the ground terminal is configured to be coupled to an appliance ground wire of the appliance wire harness and the upper stud of the ground terminal is configured to be coupled to a building ground wire.

In a further embodiment, a power connector system for an appliance is provided and includes an appliance wire harness having an appliance line wire, an appliance neutral wire, and an appliance ground wire. The power connector system includes an appliance power connector coupled to the applicant wire harness and configured to be coupled to a building wire harness. The appliance power connector includes a terminal block and power terminals coupled to the terminal block. The power terminals include a line terminal, a neutral terminal and a ground terminal. The power connector system includes the terminal block including a base has an upper surface and a lower surface. The base includes pockets spaced apart along the upper surface. The terminal block includes an upper shroud and a lower shroud. The upper shroud has upper shroud walls extending from the base forming upper chambers above the upper surface. The upper shroud walls separate the upper chambers from each other. The upper chambers is aligned with the pockets. The lower shroud has lower shroud walls extending from the base forming lower chambers below the lower surface. The lower shroud walls separate the lower chambers from each other. The lower chambers is aligned with the pockets, The terminal block includes an appliance mounting feature for mounting the terminal block to the appliance. Each power terminal includes a main body, an upper stud extending from a top of the main body and a lower stud extending from a bottom of the main body. The main body is received in the corresponding pocket. The upper stud is located in the corresponding upper chamber above the base. The lower threaded stud is located in the corresponding lower chamber below the base. The lower stud of the line terminal is coupled to the appliance line wire of the appliance wire harness by a first threaded nut. The lower stud of the neutral terminal is coupled to the appliance neutral wire of the appliance wire harness by a second threaded nut, and the lower stud of the ground terminal is coupled to the appliance ground wire of the appliance wire harness by a third threaded nut.

DETAILED DESCRIPTION OF THE INVENTION

Figure 1:
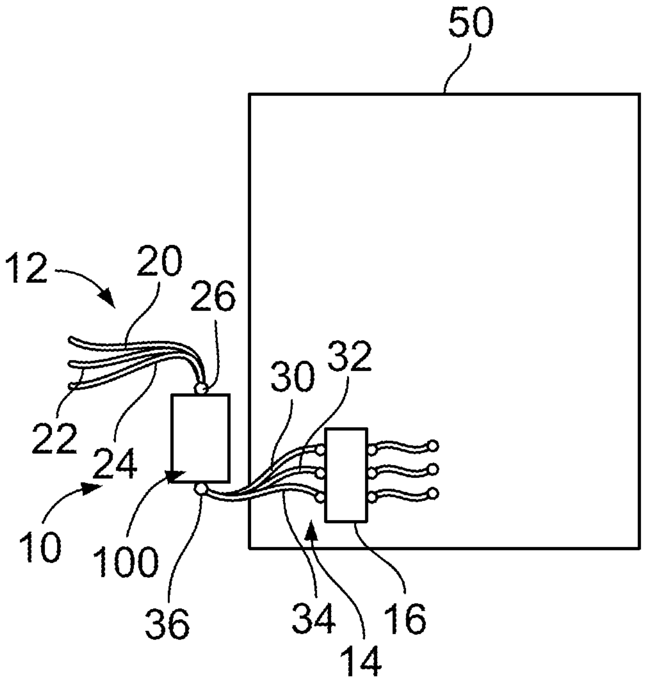
FIG. 1 is a schematic view of a power connector system for an appliance in accordance with an exemplary embodiment.

FIG. 1 is a schematic view of a power connector system 10 for an appliance 50 in accordance with an exemplary embodiment. The power connector system 10 is used for powering the appliance 50. The power connector system 10 includes an appliance power connector 100 used to connect building wiring 12 to appliance wiring 14. In various embodiments, the building wiring 12 may include a cable assembly having a plug (not shown) at an end of the wiring configured to be plugged into an outlet of the building. The building wiring 12 supplies power from the building to the appliance 50. In other various embodiments, the building wiring 12 may be wiring routed in a wall of the building being directly connected to the appliance 50. In an exemplary embodiment, the appliance power connector 100 is a single device. In alternative embodiments, the power connector system 10 may include multiple appliance power connectors 100.

In an exemplary embodiment, the building wiring 12 is connected to one side of the appliance power connector 100 and the appliance wiring 14 is connected to and opposite sides of the appliance power connector 100. The appliance power connector 100 may be mounted to the appliance 50, such as a frame, a wall, or another component of the appliance 50. The appliance power connector 100 may be mounted internally within the interior of the appliance 50. The appliance power connector 100 may be mounted to a back or the bottom of the appliance 50 such that the building wiring 12 is not viewable from the top or front of the appliance 50. Other mounting locations are possible in alternative embodiments.

In an exemplary embodiment, the building wiring 12 includes a building line wire 20, a building neutral wire 22, and a building ground wire 24. Optionally, terminals 26, such as ring terminals, may be provided at the ends of the wires 20, 22, 24. The wires 20, 22, 24 may be part of a wire assembly. For example, the wires 20, 22, 24 may be part of a single power cable. For example, the wires 20, 22, 24 may be surrounded by a jacket, sheath, tube, and the like. The building wiring 12 supplies power to the appliance power connector 100 and the appliance wiring 14 to power the appliance 50.

In an exemplary embodiment, the appliance wiring 14 includes an appliance line wire 30, an appliance neutral wire 32, and an appliance ground wire 34. Optionally, terminals 36, such as ring terminals, may be provided at the ends of the wires 30, 32, 34. The wires 30, 32, 34 may be part of a wire assembly. For example, the wires 30, 32, 34 may be part of a single power cable. For example, the wires 30, 32, 34 may be surrounded by a jacket, sheath, tube, and the like.

Alternatively, the wires 30, 32, 34 may be individual wires that are grouped together as a wire harness. The appliance wiring 14 supplies power to the appliance 50 from the appliance power connector 100.

Optionally, the power connector system 10 may include one or more electrical components 16 between the appliance power connector 100 and the appliance wiring 14 or between the appliance wiring 14 and the appliance 50. For example, the electrical component 16 may be a circuit protection device. The electrical component 16 may include a circuit board. The electrical component 16 may be directly connected to the appliance power connector 100. Alternatively, the electrical component 16 may be remote from the appliance power connector 100 and electrically connected to the appliance power connector 100 by the appliance wiring 14.

Figure 2:
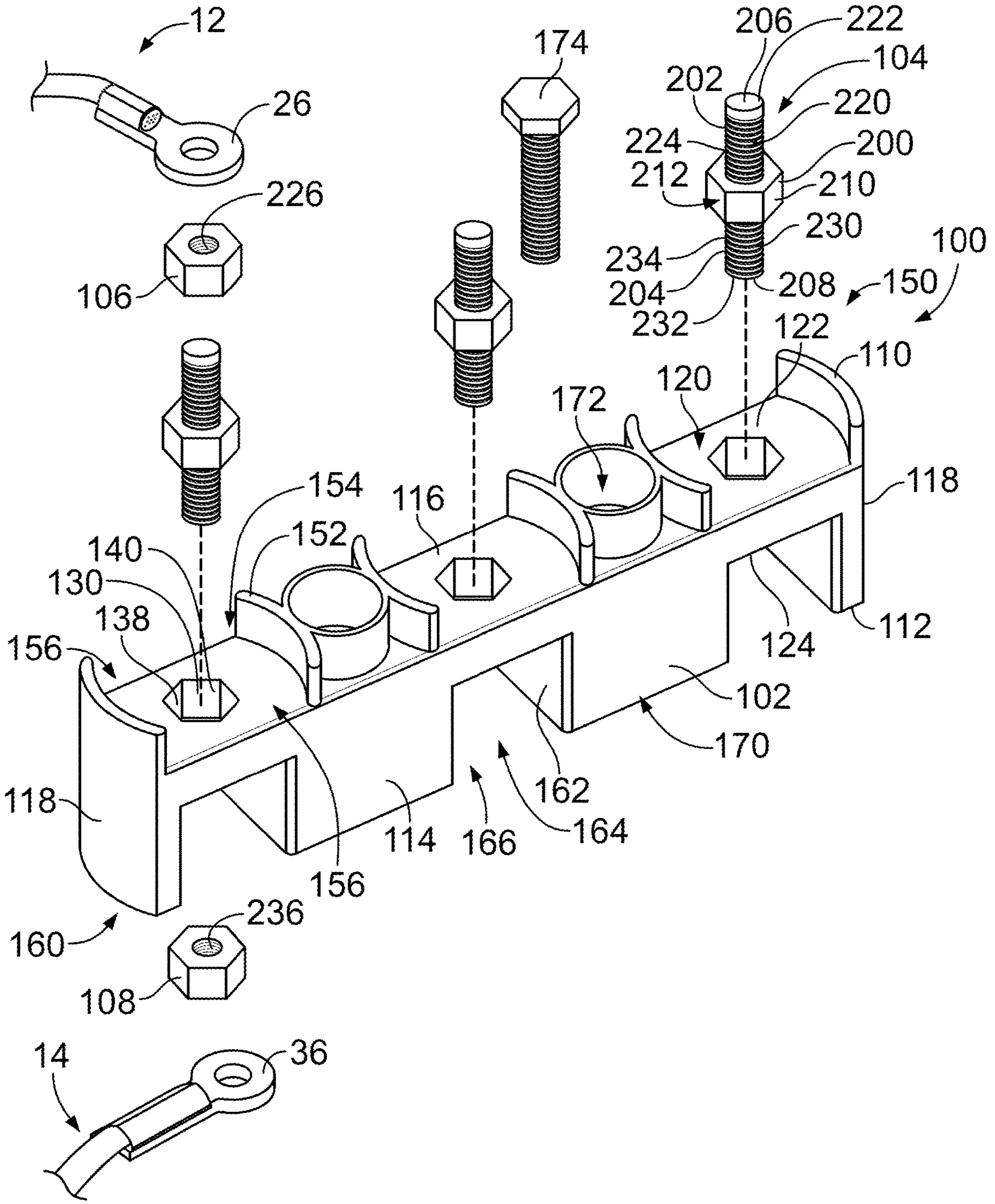
FIG. 2 is a top perspective, exploded view of the appliance power connector in accordance with an exemplary embodiment.

FIG. 2 is a top perspective, exploded view of the appliance power connector 100 in accordance with an exemplary embodiment. The appliance power connector 100 includes a terminal block 102 and one or more power terminals 104 coupled to the terminal block 102. The building wiring 12 and the appliance wiring 14 are terminated to the power terminals 104. For example, the ring terminals 26, 36 are coupled to the power terminals 104. In an exemplary embodiment, the ring terminals 26, 36 are configured to be coupled to opposite sides of the power terminals 104. Threaded nuts 106, 108 are used here the ring terminals 26, 36 to the power terminals 104. The threaded nuts 106, 108 may be threadably coupled to opposite ends of the power terminals 104.

The terminal block 102 is manufactured from a dielectric material, such as a plastic material. In an exemplary embodiment, the terminal block 102 is a molded part. For example, the terminal block 102 may be an injection molded. The terminal block 102 includes a top 110 and the bottom 112. The terminal block 102 includes a front 114 at the rear 116 opposite the front 114. The front 114 and the rear 116 extend between the top 110 and the bottom 112. Optionally, the front 114 and the rear 116 are generally planar and parallel to each other. However, the front 114 and the rear 116 may be nonplanar in alternative embodiments. The terminal block 102 has opposite sides 118 between the front 114 and the rear 116. Optionally, the sides 118 may be curved. Alternatively, the sides 118 may be planar and parallel to each other. In an exemplary embodiment, the terminal block 102 is elongated along a longitudinal axis that extends between the sides 118. The front 114 and/or the rear 116 may be parallel to the longitudinal axis. The terminal block 102 may have other shapes in alternative embodiments.

The terminal block 102 includes a base 120 having an upper surface 122 and the lower surface 124. The base 120 is configured to hold the power terminals 104. In an exemplary embodiment, the base 120 includes pockets 130 that receive corresponding power terminals 104. Optionally, the pockets 130 extend entirely through the base 120. For example, the pockets 130 are open at the upper surface 122 and open at the lower surface 124. In an exemplary embodiment, the power terminals 104 are loaded into the pockets 130 through the upper surface 122. Portions of the power terminals 104 extend above the upper surface 122 and portions of the power terminals 104 extend along the lower surface 124. As such, the power terminals 104 are accessible from above and below the base 120 for connection to the corresponding terminals 26, 36.

Figure 3:
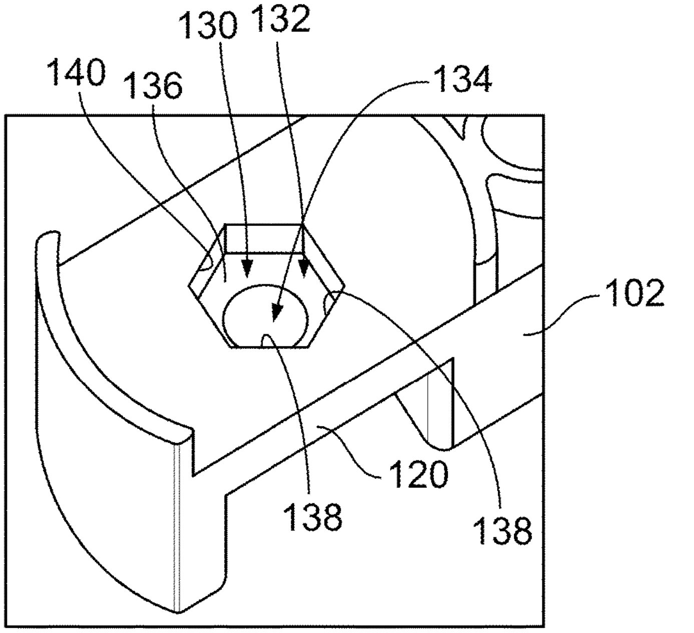
FIG. 3 is a top perspective view of a portion of the terminal block in accordance with an exemplary embodiment.

FIG. 3 is a top perspective view of a portion of the terminal block 102 in accordance with an exemplary embodiment. FIG. 3 illustrates one of the pockets 130 formed in the base 120 of the terminal block 102. The pocket 130 passes through the base 120. In an exemplary embodiment, the pocket 130 includes an upper portion 132 and a lower portion 134. In an exemplary embodiment, the terminal block 102 includes a shoulder 136 extending into the pocket 130. The shoulder 136 is provided at the bottom of the upper portion 132. The shoulder 136 is used to support the power terminal 104 in the pocket 130. For example, the power terminal 104 may be seated against the shoulder 136 when received in the pocket 130.

In an exemplary embodiment, the upper portion 132 is shaped differently than the lower portion 134. In the illustrated embodiment, the lower portion 134 is cylindrical and the upper portion 132 is polygonal shaped, such as being hexagonal shaped. For example, the upper portion 132 includes a plurality of flat wall segments 138 (for example, six wall segments 138) surrounding the outer perimeter of the pocket 130. The lower portion 134 and/or the upper portion 132 may have other shapes in alternative embodiments. In various embodiments, the lower portion 134 and the upper portion 132 may have the same shape but may have different sizes, such as different diameters.

In an exemplary embodiment, the terminal block 102 includes one or more interference features 140 extending into the pocket 130. The interference features 140 may be provided on one or more of the wall segments 138. The power terminal 104 is configured to engage the interference features 140 when received in the pocket 130. The interference features 140 may hold the power terminal 104 in the pocket 130 by an interference fit. In various embodiments, the interference features 140 are crush ribs. The terminal block 102 may include other types of securing features in alternative embodiments, such as latches, clips, tabs, slots, grooves, and the like in the pocket 130 configured to interface with the power terminal 104 to hold the power terminal 104 in the pocket 130.

Returning to FIG. 2, the terminal block 102 includes an upper shroud 150 at the top 110 and a lower shroud 160 at the bottom 112. The upper shroud 150 is configured to surround upper portions of the power terminals 104. The lower shroud 160 is configured to surround lower portions of the power terminals 104. The shroud 150, 160 surround the power terminals 104 to protect the power terminals 104 from damage. The shrouds 150, 160 may protect against electrical shock by surrounding portions of the power terminals 104 and preventing inadvertent touching or electrical shorting. The shrouds 150, 160 may provide electrical isolation between the power terminals 104 by preventing electrical arcing between the power terminals 104.

The upper shroud 150 includes upper shroud walls 152 extending upward from the base 120. The upper shroud walls 152 form upper chambers 154 above the upper surface 122 of the base 120. The upper chambers 154 are aligned with the pockets 130. In the illustrated embodiment, three upper chambers 154 are stacked side-by-side along the longitudinal axis of the terminal block 102 with the upper shroud walls 152 separating the upper chambers 154 from each other. Portions of the power terminals 104 extend into the upper chambers 154. The upper shroud walls 152 provide protection for the power terminals 104 and electrical isolation between the power terminals 104. In an exemplary embodiment, the upper shroud walls 152 are non-continuous. For example, the upper shroud walls 152 have gaps or spaces therebetween that form windows 156. In the illustrated embodiment, the terminal block 102 includes front windows 156 at the front 114 and rear windows 156 at the rear 116. The windows 156 provide access to the power terminals 104 in the upper chambers 154, such as for viewing the connection between the power terminals 104 and the building wiring 12 or for access by a tool to make the electrical connection between the power terminals 104 and the building wiring 12. The upper shroud walls 152 extend between the front 114 and the rear 116. In the illustrated embodiment, the upper shroud walls 152 are curved making semicircular wall segments between the power terminals 104. The upper shroud walls 152 may have other shapes in alternative embodiments, such as being planar and perpendicular to the front 114 and/or the rear 116.

The lower shroud 160 includes lower shroud walls 162 extending upward from the base 120. The lower shroud walls 162 form lower chambers 164 below the lower surface 124 of the base 120. The lower chambers 164 are aligned with the pockets 130. In the illustrated embodiment, three lower chambers 164 are stacked side-by-side along the longitudinal axis of the terminal block 102 with the lower shroud walls 162 separating the lower chambers 164 from each other. Portions of the power terminals 104 extend into the lower chambers 164. The lower shroud walls 162 provide protection for the power terminals 104 and electrical isolation between the power terminals 104. In an exemplary embodiment, the lower shroud walls 162 are non-continuous. For example, the lower shroud walls 162 have gaps or spaces therebetween forming windows 166 that provide access to the power terminals 104 in the lower chambers 164. The lower shroud walls 162 extend between the front 114 and the rear 116. In the illustrated embodiment, the lower shroud walls 162 are planar and perpendicular to the front 114 and/or the rear 116. The lower shroud walls 162 may have other shapes in alternative embodiments.

In an exemplary embodiment, the terminal block 102 includes mounting portions 170 configured be mounted to the appliance 50. For example, the mounting portions 170 may be mounted to the frame or a wall of the appliance 50. In the illustrated embodiment, the mounting portions 170 are provided at the bottom 112 of the terminal block 102. The lower shroud walls 162 define the mounting portions 170. In an exemplary embodiment, a fastener openings 172 pass through the terminal block 102 at the mounting portions 170. The fastener openings 172 to receive fasteners 174 used to secure the terminal block 102 to the appliance 50. The fasteners 174 may be threaded fasteners configured to be threadably coupled to the appliance 50. Other types of fasteners may be used in alternative embodiments. In other various embodiments, the terminal block 102 may be secured to the appliance 50 by other types of securing features, such as latches, clips, mounting brackets and the like.

The power terminals 104 are used to electrically connect the building wiring 12 with the appliance wiring 14. In an exemplary embodiment, the power terminals 104 are double ended power terminals configured to be electrically connected to the wiring 12, 14 at opposite ends of the power terminals 104. Each power terminal 104 includes a main body 200, an upper stud 202 and a lower stud 204. The upper stud 202 extends from a top 206 of the main body 200. The lower stud extends from a bottom 208 of the main body 200. The upper stud 202 is aligned with the lower stud 204 along a central axis of the power terminal 104. In various embodiments, the upper stud 202 is a threaded stud and the lower stud 204 is a threaded stud. However, the studs 202, 204 may be smooth posts rather than being threaded studs in alternative embodiments.

In an exemplary embodiment, the main body 200 is approximately centered along the power terminal 104. The main body 200 has a different shape than the studs 202, 204. For example, in the illustrated embodiment, the main body 200 has a polygonal shape, such as a hexagonal shape, while the studs 202, 204 are generally cylindrical shaped. In an exemplary embodiment, the main body 200 is wider than the studs 202, 204 having exposed surfaces at the top 206 and at the bottom 208. The bottom 208 may be seated against the shoulder 136 of the pocket 130 when the power terminal 104 is loaded into the terminal block 102.

The main body 200 includes a plurality of flat surfaces 210 around an outer perimeter of the main body 200. The flat surfaces 210 may face corresponding wall segments 138 when the power terminal 104 is received in the pocket 130. One or more of the flat surfaces 210 may engage the crush ribs 140 to mechanically secure the power terminal 104 in the terminal block 102, such as by an interference fit. In an exemplary embodiment, one or more of the flat surfaces 210 define a locating surface 212 for the power terminal 104. The locating surface 212 is configured to engage the terminal block 102 to locate the power terminal 104 relative to the terminal block 102. In an exemplary embodiment, the locating surface 212 engages the corresponding wall segment 138 of the pocket 130. The locating surface 212 positions the power terminal 104 relative to the terminal block 102 in one or more directions perpendicular to the central axis of the power terminal 104. The locating surface 212 may resist rotation of the power terminal 104 relative to the terminal block 102. Optionally, all of the flat surfaces 210 may form locating surfaces 212, with each of the flat surfaces 210 engaging the corresponding wall segments 138 to position the power terminal 104 in the terminal block 102.

The upper stud 202 includes a shank 220 extending from the main body 200 to a distal end 222 at a top of the power terminal 104. At least a portion of the shank 220 includes threads 224 along the exterior thereof. The upper stud 202 is configured to be threadably coupled with the threaded nut 106. The threaded nut 106 includes internal threads 226 threadably coupled to the threads 224 of the upper stud 202.

The lower stud 204 includes a shank 230 extending from the main body 200 to a distal end 232 at a bottom of the power terminal 104. At least a portion of the shank 230 includes threads 234 along the exterior thereof. The lower stud 204 is configured to be threadably coupled with the threaded nut 108. The threaded nut 108 includes internal threads 236 threadably coupled to the threads 234 of the lower stud 204. Optionally, the lower stud 204 has the same diameter as the upper stud 202. However, in alternative embodiments, the lower stud 204 may have a different diameter as the upper stud 202.

Figure 4:
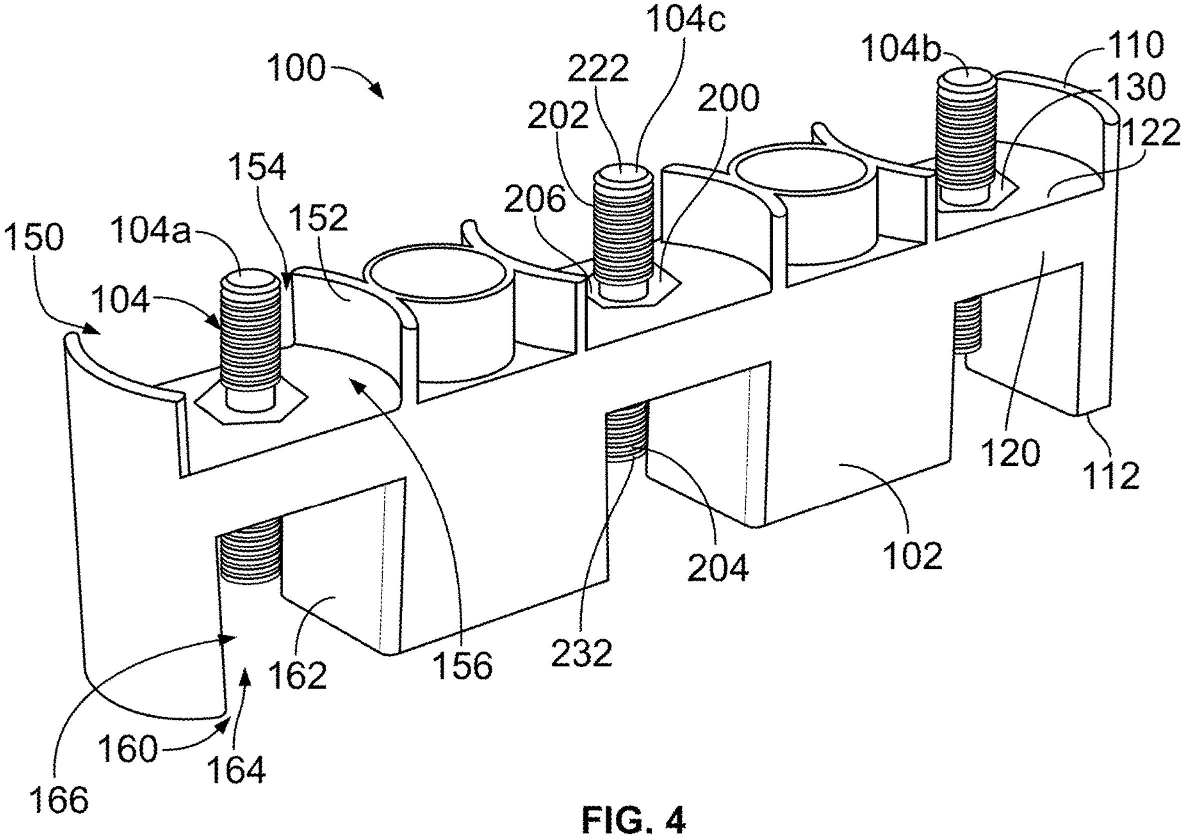
FIG. 4 is a perspective view of the appliance power connector in accordance with an exemplary embodiment.
Figure 5:
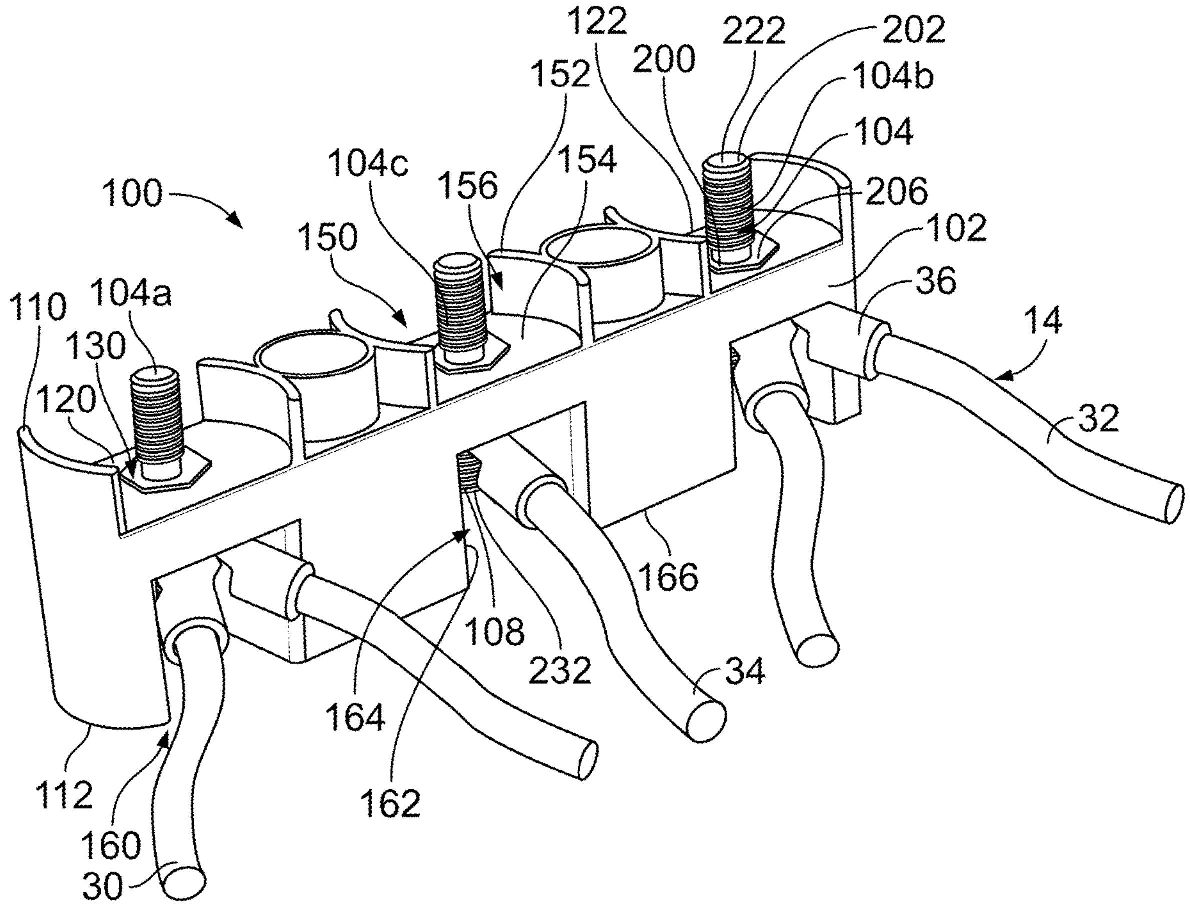
FIG. 5 is a perspective view of the appliance power connector in accordance with an exemplary embodiment showing appliance wiring connected to the appliance power connector.

FIG. 4 is a perspective view of the appliance power connector 100 in accordance with an exemplary embodiment. FIG. 5 is a perspective view of the appliance power connector 100 in accordance with an exemplary embodiment showing appliance wiring 14 connected to the appliance power connector 100. In an exemplary embodiment, the terminal block 102 of the appliance power connector 100 holds three of the power terminals 104 for connection with the appliance line wire 30, the appliance neutral wire 32, and the appliance ground wire 34. As such, the power terminals 104 define a line terminal 104*a*, a neutral terminal 104*b*, and a ground terminal 104*c*.

FIGS. 4 and 5 illustrate the power terminals 104 loaded into the terminal block 102. In an exemplary embodiment, the power terminals 104 are loaded into the corresponding pockets 130 of the terminal block 102 from above (for example, through the upper surface 122). The main body 200 of each power terminal 104 is received in the corresponding pocket 130. The bottoms of the main bodies 200 may be seated against the shoulders 136 (shown in FIG. 2) of the pocket 130. In an exemplary embodiment, the top 206 of each main body 200 may be generally coplanar with the upper surface 122 of the base 120. The upper studs 202 extend into the corresponding upper chambers 154 of the upper shroud 150. The lower studs 204 extend into the corresponding lower chambers 164 of the lower shroud 160.

In an exemplary embodiment, the lower shroud walls 162 have heights that are greater than the height of the lower studs 204 such that the bottoms of the lower shroud walls 162 are located below the distal ends 232 of the lower studs 204. As such, the bottom of the terminal block 102 may be mounted to a mounting structure, such as the appliance without damaging the power terminals 104 and without interference from the lower studs 204. The windows 166 provide access to the lower studs 204, such as for electrical connection to the appliance wiring 14. Optionally, the lower chambers 164 may be open at the bottom 112 to allow loading of the ring terminals 36 onto the lower studs 204 from below the appliance power connector 100. For example, the appliance wiring 14 may be connected to the appliance power connector 100 prior to mounting the appliance power connector 100 to the mounting structure of the appliance 50. In an exemplary embodiment, multiple appliance line wires 30 and/or multiple appliance neutral wires 32 and/or multiple appliance ground wires 34 may be connected to the line terminal 104*a*, the neutral terminal 104*b*, and the ground terminal 104*c*, respectively. The threaded nuts 108 may be threadably coupled to the power terminals 104 to mechanically and electrically connect the ring terminals 36 to the power terminals 104.

In an exemplary embodiment, the upper shroud walls 152 have heights that may be greater than the height of the upper studs 202 such that the tops of the upper shroud walls 152 are located above the distal ends 222 of the upper studs 202. Alternatively, as in the illustrated embodiment, the upper shroud walls 152 have heights less than the height of the upper studs 202. The distal ends 222 of the upper studs 202 are located above the tops of the upper shroud walls 152. The windows 156 provide access to the upper studs 202, such as for electrical connection to the building wiring 12. Optionally, the upper chambers 154 may be open at the top 110 to allow loading of the ring terminals 26 onto the upper studs 202 from above the appliance power connector 100. The threaded nuts 106 may be threadably coupled to the power terminals 104 to mechanically and electrically connect the ring terminals 26 to the power terminals 104.

Figure 6:
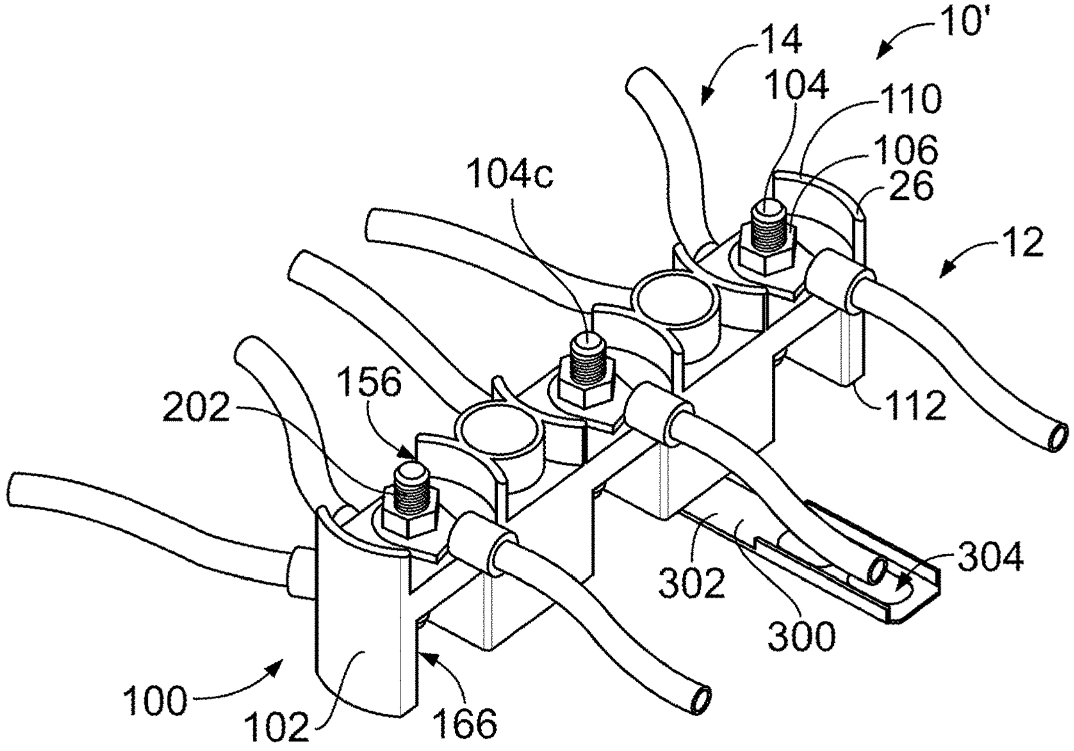
FIG. 6 is a top perspective view of the power connector system in accordance with an exemplary embodiment.
Figure 7:
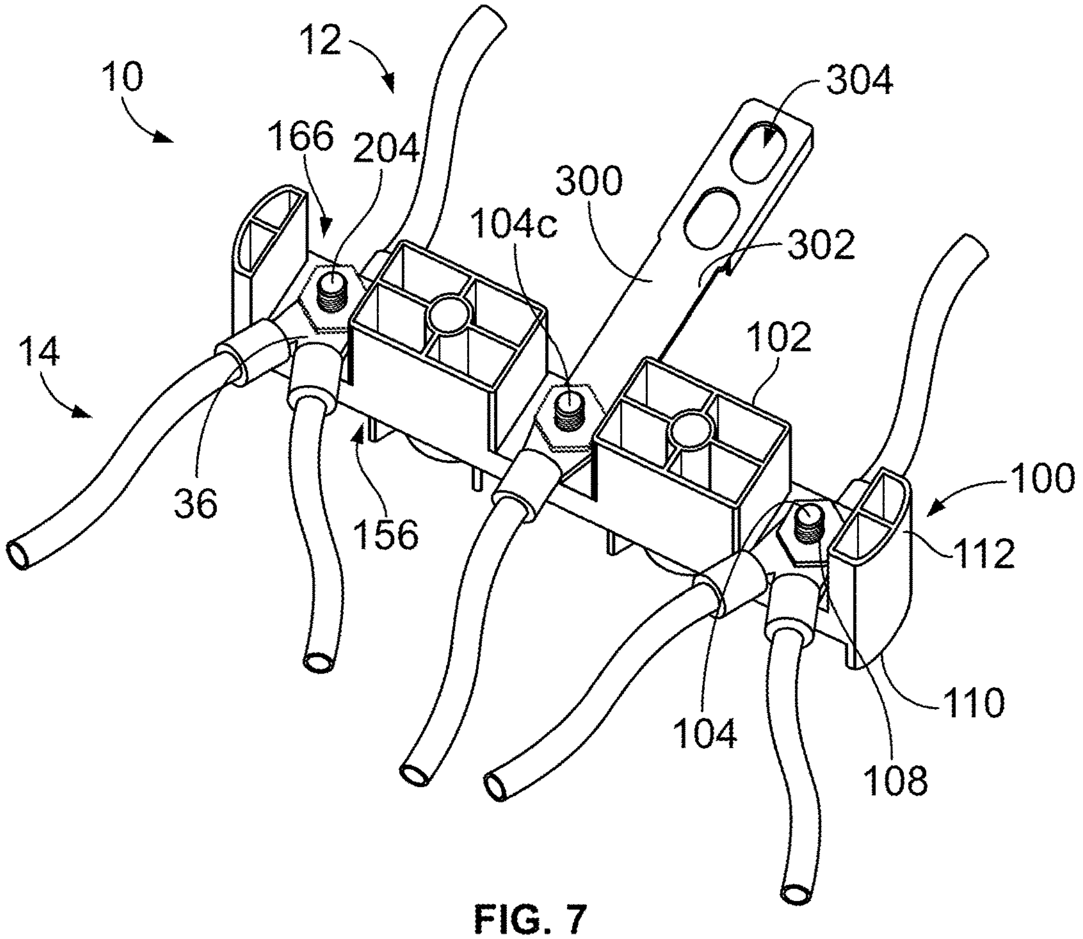
FIG. 7 is a bottom perspective view of the power connector system in accordance with an exemplary embodiment.

FIG. 6 is a top perspective view of the power connector system 10 in accordance with an exemplary embodiment. FIG. 7 is a bottom perspective view of the power connector system 10 in accordance with an exemplary embodiment. FIGS. 6 and 7 illustrate the building wiring 12 and the appliance wiring 14 coupled to the appliance power connector 100. The threaded nuts 106, 108 are secured to the upper and lower studs 202, 204, respectively.

In use, the appliance wiring 14 (FIG. 7) is initially connected to the appliance power connector 100. The ring terminals 36 (FIG. 7) of the appliance wiring 14 are coupled to the lower studs 204. In an exemplary embodiment, a ground strap 300 is coupled to the ground terminal 104*c*. The ground strap 300 may include a metal plate 302 having openings 304 for receiving the ground terminal 104*c*, fasteners or other components. The ground strap 300 may be coupled to the appliance 50, such as to a frame or other grounded part of the appliance 50. The lower threaded nuts 108 are threadably coupled to the lower studs 204 to secure the ring terminals 36 and the ground strap 300 to the power terminals 104. The ring terminals 36 and the ground strap 300 exit the terminal block 102 through the windows 166. After the lower threaded nuts 108 are secured to the lower studs 204, the power terminals 104 are retained in the terminal block 102. The power terminals 104 are unable to be removed from the terminal block 102 from the top 110. The main bodies 200 of the power terminals 104 are seated against the shoulders 136 in the pockets 130 and the power terminals 104 are unable to be removed from the terminal block 102 through the bottom 112.

After the appliance wiring 14 is connected to the appliance power connector 100, the appliance power connector 100 may be mounted to the appliance 50. After the appliance power connector 100 is mounted to the appliance 50, the building wiring 12 (FIG. 6) may be connected to the appliance power connector 100. The ring terminals 26 (FIG. 6) are coupled to the upper studs 202. The upper threaded nuts 106 are threadably coupled to the upper studs 202 to secure the ring terminals 26. The ring terminals 26 exit the terminal block 102 through the windows 156. The double ended power terminals 104 allow connection of the building wiring 12 and the appliance wiring 14 to opposite sides of the appliance power connector 100.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms “including” and “in which” are used as the plain-English equivalents of the respective terms “comprising” and “wherein.” Moreover, in the following claims, the terms “first,” “second,” and “third,” etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase “means for” followed by a statement of function void of further structure.

What is claimed is:

1. An appliance power connector comprising:

a terminal block having a base, the base includes an upper surface and a lower surface, the base includes a pocket, the base including an opening to the pocket open at at least one of the upper surface and the lower surface, the base surrounding the pocket on all sides, the terminal block includes an upper shroud and a lower shroud, the upper shroud having upper shroud walls extending from the base above the upper surface and an adjoining wall surrounding all sides of at least one fastener opening, the lower shroud having lower shroud walls extending from the base;

a power terminal coupled to the terminal block, the power terminal including a main body, an upper stud extending from a top of the main body and a lower stud extending from a bottom of the main body, the main body being loaded into the pocket through the opening, the main body being surrounded on all sides by the base of the terminal block to prevent rotation of the power terminal relative to the terminal block, the upper stud being located above the base for connection to an upper power cable terminal, the lower stud being located below the base for connection to a lower power cable terminal.

2. The appliance power connector of claim 1, further comprising an upper nut threadably coupled to the upper stud to couple the upper power cable terminal to the power terminal and a lower nut threadably coupled to the lower stud to couple the lower power cable terminal to the power terminal.

3. The appliance power connector of claim 1, wherein the pocket is open at the upper surface to receive the power terminal, the base having a shoulder extending into the pocket, the main body being seated in the pocket against the shoulder.

4. The appliance power connector of claim 1, wherein the main body has a first polygonal shape, the pocket having a second polygonal shape that complements the first polygonal shape to prevent rotation of the main body.

5. The appliance power connector of claim 1, wherein the terminal block includes an interference feature extending into the pocket, the main body engaging the interference feature in the pocket to hold the power terminal in the terminal block by an interference fit.

6. The appliance power connector of claim 1, wherein the terminal block includes a mounting portion configured to be mounted to an appliance, the mounting portion having an opening receiving a fastener configured to secure the terminal block to the appliance.

7. The appliance power connector of claim 1, wherein the upper shroud walls are curved.

8. The appliance power connector of claim 1, wherein the upper shroud includes a window at a front of the terminal block between the upper shroud walls, the window providing access to the upper chamber from the front.

9. The appliance power connector of claim 1, further comprising a ground strap electrically coupled to the lower stud of the power terminal.

10. The appliance power connector of claim 1, wherein the main body includes a locating surface, the locating surface engaging the terminal block to locate the power terminal relative to the terminal block.

11. The appliance power connector of claim 10, wherein the locating surface engages the base of the terminal block to resist rotation of the power terminal relative to the terminal block.

12. The appliance power connector of claim 10, wherein the locating surface is one of a plurality of locating surfaces arranged around a perimeter of the main body.

13. An appliance power connector comprising:

a terminal block having a base, the base includes an upper surface and a lower surface, the base includes pockets spaced apart along the upper surface, the base including openings to the pockets each open at at least one of the upper surface and the lower surface, the base surrounding the pockets on all sides, the terminal block includes an upper shroud and a lower shroud, the upper shroud having upper shroud walls extending from the base forming upper chambers above the upper surface and an adjoining wall surrounding all sides of at least one fastener opening, the upper shroud walls separate the upper chambers from each other, the upper chambers being aligned with the pockets, the lower shroud having lower shroud walls extending from the base forming lower chambers below the lower surface, the lower shroud walls separate the lower chambers from each other, the lower chambers being aligned with the pockets;

power terminals coupled to the terminal block at the pockets, the power terminals including a line terminal, a neutral terminal and a ground terminal, each power terminal including a main body, an upper stud extending from a top of the main body and a lower stud extending from a bottom of the main body, the main body having a locating surface, the main body being loaded into the corresponding pocket through the corresponding opening with the locating surface engaging the terminal block to locate the power terminal relative to the terminal block, the main body being surrounded on all sides by the base of the terminal block to prevent rotation of the power terminal relative to the terminal block, the upper stud being located in the corresponding upper chamber above the base, the lower threaded stud being located in the corresponding lower chamber below the base; and a ground strap electrically coupled to the lower stud of the power terminal defining the ground terminal;

wherein the lower stud of the line terminal is configured to be coupled to an appliance line wire of an appliance wire harness and the upper stud of the line terminal is configured to be coupled to a building line wire, wherein the lower stud of the neutral terminal is configured to be coupled to an appliance neutral wire of the appliance wire harness and the upper stud of the neutral terminal is configured to be coupled to a building neutral wire, and wherein the lower stud of the ground terminal is configured to be coupled to an appliance ground wire of the appliance wire harness and the upper stud of the ground terminal is configured to be coupled to a building ground wire.

14. The appliance power connector of claim 13, wherein the terminal body is elongated along a longitudinal axis, the pockets being spaced apart along the longitudinal axis.

15. The appliance power connector of claim 13, wherein the upper shroud walls are located between the upper studs to isolate the upper studs from each other, the lower shroud walls being located between the lower studs to isolate the lower studs from each other.

16. The appliance power connector of claim 13, further comprising:

lower nuts threadably coupled to the lower studs to couple the power terminals to corresponding lower power cable terminals of the building line wire, the building neutral wire, and the building ground wire; and upper nuts threadably coupled to the upper studs to couple the power terminals to corresponding upper power cable terminals of the appliance line wire, the appliance neutral wire, and the appliance ground wire.

17. A power connector system for an appliance comprising:

an appliance wire harness having an appliance line wire, an appliance neutral wire, and an appliance ground wire;

an appliance power connector coupled to the appliance wire harness and configured to be coupled to a building wire harness, the appliance power connector including a terminal block and power terminals coupled to the terminal block, the power terminals including a line terminal, a neutral terminal and a ground terminal;

the terminal block including a base having an upper surface and a lower surface, the base includes pockets spaced apart along the upper surface, the base including openings to the pockets open at at least one of the upper surface and the lower surface, the base surrounding each of the pockets on all sides, the terminal block includes an upper shroud and a lower shroud, the upper shroud having upper shroud walls extending from the base forming upper chambers above the upper surface and an adjoining wall surrounding all sides of at least one fastener opening, the upper shroud walls separate the upper chambers from each other, the upper chambers being aligned with the pockets, the lower shroud having lower shroud walls extending from the base forming lower chambers below the lower surface, the lower shroud walls separate the lower chambers from each other, the lower chambers being aligned with the pockets, wherein the terminal block includes an appliance mounting feature for mounting the terminal block to the appliance;

each power terminal including a main body, an upper stud extending from a top of the main body and a lower stud extending from a bottom of the main body, the main body being loaded into the corresponding pocket through the corresponding opening, the main body being surrounded on all sides by the base of the terminal block to prevent rotation of the power terminal relative to the terminal block, the upper stud being located in the corresponding upper chamber above the base, the lower threaded stud being located in the corresponding lower chamber below the base;

wherein the lower stud of the line terminal is coupled to the appliance line wire of the appliance wire harness by a first threaded nut, the lower stud of the neutral terminal is coupled to the appliance neutral wire of the appliance wire harness by a second threaded nut, and the lower stud of the ground terminal is coupled to the appliance ground wire of the appliance wire harness by a third threaded nut.

18. The power connector system of claim 17, wherein the terminal body is elongated along a longitudinal axis, the pockets being spaced apart along the longitudinal axis.

19. The power connector system of claim 17, wherein the upper shroud walls are located between the upper studs to isolate the upper studs from each other, the lower shroud walls being located between the lower studs to isolate the lower studs from each other.

20. The power connector system of claim 17, further comprising:

lower nuts threadably coupled to the lower studs to couple the power terminals to corresponding lower power cable terminals of the building line wire, the building neutral wire, and the building ground wire; and upper nuts threadably coupled to the upper studs to couple the power terminals to corresponding upper power cable terminals of the appliance line wire, the appliance neutral wire, and the appliance ground wire.

21. The power connector system of claim 17, further comprising a ground strap electrically coupled to the lower stud of the power terminal defining the ground terminal.

* * * * *